United States Patent
Chen et al.

(10) Patent No.: US 9,169,135 B2
(45) Date of Patent: Oct. 27, 2015

(54) METHOD AND APPARATUS FOR HYDROLYZING ORGANIC SOLID

(75) Inventors: Shing Der Chen, Chiayi (TW); Chen Hua Chu, Hsinchu County (TW); Wang Kuan Chang, Hsinchu (TW); Shing Chen, Hsinchu County (TW); Teh Ming Liang, Tainan County (TW); Shan Shan Chou, Hsinchu County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 1231 days.

(21) Appl. No.: 12/974,665

(22) Filed: Dec. 21, 2010

(65) Prior Publication Data

US 2012/0055884 A1 Mar. 8, 2012

(30) Foreign Application Priority Data

Sep. 3, 2010 (TW) .............................. 99129965 A

(51) Int. Cl.
C02F 3/28 (2006.01)
C02F 1/36 (2006.01)
C02F 11/04 (2006.01)

(52) U.S. Cl.
CPC . *C02F 1/36* (2013.01); *C02F 11/04* (2013.01); *C02F 2303/26* (2013.01); *Y02E 50/343* (2013.01)

(58) Field of Classification Search
USPC ........... 210/95, 696, 721, 738, 748, 758, 759, 210/760, 763, 764, 192, 167, 195.1, 198.1, 210/205, 199, 222, 223; 422/20, 22, 24, 28, 422/186, 186.01, 186.3
See application file for complete search history.

(56) References Cited

U.S. PATENT DOCUMENTS

| 7,105,092 B2 | 9/2006 | Chiba |
| 2004/0154988 A1 | 8/2004 | Sheets |

(Continued)

FOREIGN PATENT DOCUMENTS

| CN | 1544346 A | 11/2004 |
| CN | 2702992 Y | 6/2005 |

(Continued)

OTHER PUBLICATIONS

Intellectual Property Office, Ministry of Economic Affairs, R.O.C., Office Action, Sep. 27, 2012, Taiwan.

(Continued)

*Primary Examiner* — Walter D Griffin
*Assistant Examiner* — Cameron J Allen
(74) *Attorney, Agent, or Firm* — Locke Lord LLP; Tim Tingkang Xia, Esq.

(57) ABSTRACT

A method and an apparatus for hydrolyzing an organic solid are described. The method includes mixing an organic solid and a nanobubble water having a plurality of nanobubbles, to form an organic liquid, in which the nanobubbles contain a combustible gas; and applying an ultrasonic wave on the organic liquid, such that the nanobubbles generate an additional cavitation effect. A preprocessor is applicable to an organic solid processing system having an anaerobic digestion tank, in which the anaerobic digestion tank has anaerobic microbes for generating a combustible gas. The preprocessor includes a nanobubble water generator, a digestion tank, and an ultrasonic wave generator. With the method and the structure, the nanobubbles are used to increase the probability of generation of the additional cavitation effect, and the combustible gas is used to improve an impact force of bursts produced by the cavitation effect.

4 Claims, 4 Drawing Sheets

(56) References Cited

U.S. PATENT DOCUMENTS

| | | | |
|---|---|---|---|
| 2006/0054205 A1 | 3/2006 | Yabe et al. | |
| 2006/0086659 A1 | 4/2006 | Szwajcer Dey et al. | |
| 2006/0163155 A1 | 7/2006 | Chauzy et al. | |
| 2007/0158273 A1* | 7/2007 | Cordemans de Meulenaer et al. | 210/695 |
| 2007/0163958 A1 | 7/2007 | Newcombe et al. | |
| 2007/0267334 A1* | 11/2007 | Osborn et al. | 210/97 |
| 2009/0117241 A1 | 5/2009 | Tsuji | |

FOREIGN PATENT DOCUMENTS

| | | |
|---|---|---|
| CN | 1997599 A | 7/2007 |
| CN | 101037255 A | 9/2007 |
| CN | 101456655 A | 6/2009 |
| EP | 0952116 A1 | 10/1999 |
| EP | 1494975 A1 | 1/2005 |
| EP | 1527022 A2 | 5/2005 |
| JP | 2003334548 A | 11/2003 |
| JP | 2004121962 A | 4/2004 |
| JP | 2006-289183 A | 10/2006 |
| JP | 4016099 B2 | 12/2007 |
| TW | 200302846 A | 8/2003 |
| TW | 200630305 | 9/2006 |
| TW | 200812921 | 3/2008 |
| TW | I298644 | 7/2008 |
| TW | I317349 B | 11/2009 |
| TW | M374480 | 2/2010 |
| TW | 201024209 | 7/2010 |
| TW | I371426 B1 | 9/2012 |
| WO | 03086989 A1 | 10/2003 |
| WO | 2004014808 A1 | 2/2004 |
| WO | 2004014809 A2 | 2/2004 |
| WO | 2004024640 A1 | 3/2004 |
| WO | 2004049787 A2 | 6/2004 |
| WO | 2011133533 A2 | 10/2011 |

OTHER PUBLICATIONS

Li Mei et al., Treatment of Organic Pollutants in Water by Ultrasound, Progress in Chemistry, 2008, p. 1187-1195, vol. 20, No. 7/8.

Xie Yun-Cheng, Ultrasonic Wave Technology in Waste Water Processing Applied Research, Journal of Chongqing University of Arts and Sciences (Nature Sciences Edition), 2006, p. 28-30, vol. 5, No. 3.

Mason, Timothy J. et al., Applied Sonochemistry—The Uses of Power Ultrasound in Chemistry and Processing, pp. 36-39, Wiley-VCH.

Jin, Yiying et al., Combined alkaline and ultrasonic pretreatement of sludge before aerobic digestion, Journal of Environmental Science, 2009, pp. 279-284; vol. 21.

Naddeo, Vincenzo et al., Effect of sonolysis on waste activated sludge solubilisation and anaerobic biodegradability, Desalination, 2009, pp. 762-767, vol. 249.

Show, Kuan-Yeow et al., Optimisation of sludge disruption by sonication, Water Research, 2007, pp. 4741-4747, vol. 41.

Pilli, Sridhar et al., Ultrasonic pretreatment of sludge: A review, Ultrasonic Sonochemistry, 2010.

Zhang, Guangming et al., Ultrasonic reduction of excess sludge from the activated sludge system, Journal of Hazardous Materals, 2007, pp. 515-519, vol. 145.

C. Bougrier et al., Solubilisation of waste-activated sludge by ultrasonic treatment, Chemical Engineering Journal, 2005, p. 163-169, vol. 106.

Raf Dewil et al., The Use of Ultrasonics in the Treatment of Waste Activated Sludge, Chinese J. Chem. Eng., Feb. 2006, p. 105-113, vol. 14, No. 1.

Panraj Chowdhury et al., Sonochemical degradation of chlorinated organic compounds, phenolic compounds and organic dyes—A review, ScienceDirect, Science of the Total Environment, 2009, p. 2474-2492, vol. 407.

Yusuf G. Adewuyi, Sonochemistry in Environmental Remediation. 1. Combinative and Hybrid Sonophotochemical Oxidation Processes for the Treatment of Pollutants in Water, Environmental Science & Technology, 2005, p. 3409-3420, vol. 39, No. 10.

"Office Action" issued by the Taiwan Intellectual Property Office, Ministry of Economic Affairs, R.O.C. on Dec. 4, 2014.

* cited by examiner

METHOD AND APPARATUS FOR HYDROLYZING ORGANIC SOLID

CROSS-REFERENCE TO RELATED APPLICATIONS

This non-provisional application claims priority under 35 U.S.C. §119(a) on Patent Application No(s). 099129965 filed in Taiwan, R.O.C. on Sep. 3, 2010, the entire contents of which are hereby incorporated by reference.

BACKGROUND OF THE DISCLOSURE

1 Field of Disclosure

The present disclosure relates to a hydrolyzing method and apparatus, and more particularly to a method for hydrolyzing an organic solid and an associated preprocessor for anaerobic digestion treatment.

2. Related Art

Generally, most of the present organic solid processing is performed in the manner of digesting organic solids by aerobic or anaerobic microbes, to achieve the effect of reducing the quantity of the solids. However, such biological digestion process costs considerably long time. In order to shorten the time needed by the biological digestion process, a chemical or physical pretreatment is mostly adopted. The pretreatment is used to decompose or crack the organic solids from large molecules to small molecules, so as to increase the digestion speed of the aerobic or anaerobic microbes, and effectively shorten the overall digestion time of the organic solids.

A well-known and common chemical pretreatment method is a method of alkaline hydrolysis, which includes the following steps. An organic solid is guided into a processing tank, precipitated and hydrolyzed by adding alkali, and then dried for recovery. However, the overall processing time of the organic solid is increased. The added chemical will not only increase salts in the original organic solid, but also may cause secondary damage on environment, such as chemical pollution. Therefore, the chemical pretreatment should be performed very cautiously, and thus the application of the chemical pretreatment is always limited. Moreover, organic fertilization cannot be achieved after performing the chemical pretreatment, and thus the value of the organic solid after treatment is reduced.

Further, well-known and common physical pretreatment methods generally crack by means of giving external forces, and the most common method includes the following steps. An organic solid is mixed with water, and then hydrolyzed by applying an ultrasonic wave, to crack the organics in the organic solids by means of the energy of the ultrasonic wave in the water, so as to facilitate the digestion of the aerobic or anaerobic microbes, thus reducing the overall digestion time of the organic solids.

Briefly, the physical pretreatment by cracking with an ultrasonic wave may prevent the secondary environment pollution that may be caused by chemical pretreatment, but the generation of the ultrasonic wave needs to be driven by an external power supply, especially for treatment of a large quantity of organic solids, which will definitely consume a large amount of power. Therefore, it is always an objective for related manufacturers to strive to find a method or means capable of reducing the operation time of ultrasonic wave while maintaining the same cracking efficiency of the ultrasonic wave or capable of achieving a higher efficiency of organic solid hydrolysis with the same operation time of ultrasonic wave.

SUMMARY OF THE DISCLOSURE

Accordingly, the present disclosure provides a method for improving ultrasonic wave hydrolysis efficiency by using a nanobubble water and a preprocessor for hydrolyzing an organic solid applicable to an anaerobic digestion tank.

A method for hydrolyzing an organic solid in accordance with present disclosure comprises the following steps.

An organic solid is mixed with a nanobubble water to form an organic liquid, in which the nanobubble water has a plurality of nanobubbles, and the nanobubbles contain a combustible gas.

An ultrasonic wave is applied on the organic liquid, such that the nanobubbles generate an additional cavitation effect (compared with an intrinsic cavitation effect generated in the organic liquid).

In a preprocessor for hydrolyzing an organic solid applicable to an anaerobic digestion tank, the anaerobic digestion tank has anaerobic microbes, for generating a combustible gas, and the preprocessor comprises a nanobubble water generator, a ultrasonic tank, and an ultrasonic wave generator.

The nanobubble water generator is used for making a plurality of nanobubbles by using the combustible gas generated from the anaerobic digestion tank, and mixing the nanobubbles with water to form a nanobubble water. The ultrasonic tank is used for accommodating the organic liquid, in which the organic liquid contains an organic solid and the nanobubble water. The ultrasonic wave generator is used for generating an ultrasonic wave to the organic liquid in the ultrasonic tank, such that the nanobubbles generate a cavitation effect.

In view of the above, when the nanobubble water containing the nanobubbles is mixed with the organic solid, and the ultrasonic wave is applied on the organic liquid, besides an intrinsic cavitation effect generated in the organic liquid, an additional cavitation effect is also generated by the nanobubbles, which will breakdown to be more bursts. Surrounding organic solid is subjected to the impact force of more bursts to produce better cracking effect, thereby accelerating the decomposition of the organic solid. Moreover, due to the volume characteristic of the nanobubbles, the nanobubbles will be uniformly distributed in the organic liquid and may not float up due to its own buoyancy, and thus the organic liquid is uniformly inflated, and the bursting positions caused by the cavitation effect are uniform.

In addition, the nanobubbles are further filled with a combustible gas, such that when the nanobubbles generate the cavitation effect, combustion also occurs, which increases the impact force of the bursts and improves the efficiency of the organic solid hydrolysis.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION OF THE DISCLOSURE

Figure 1A:
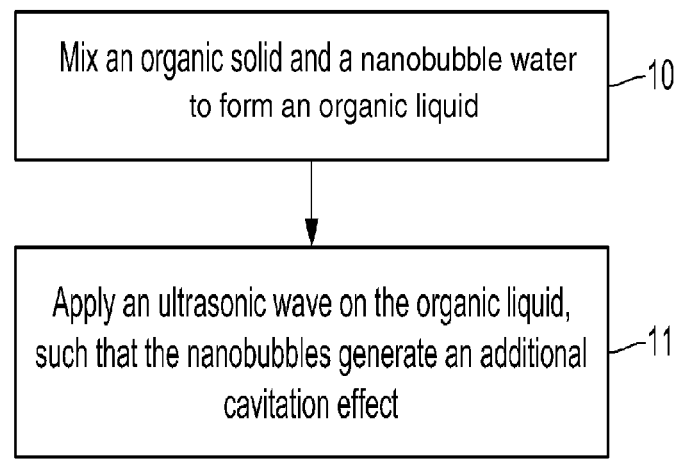
FIG. 1A is a flow chart of a method for hydrolyzing an organic solid according to the present disclosure.
Figure 1B:
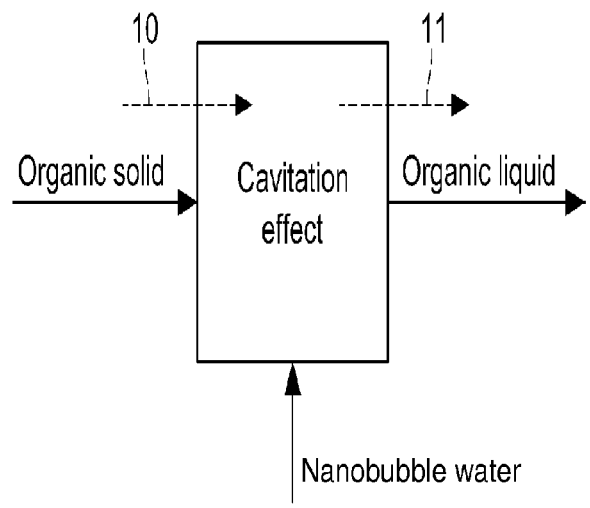
FIG. 1B is a schematic view of implementation of the method for hydrolyzing the organic solid according to the present disclosure.

FIG. 1A is a flow chart of a method for hydrolyzing an organic solid according to the present disclosure, and FIG. 1B is a schematic view of implementation of the method for hydrolyzing the organic solid. The method for hydrolyzing the organic solid is applicable to processing of organic wastes, in which an organic solid is cracked and supplied to aerobic or anaerobic microbes for digestion, so as to improve the efficiency of organic sludge processing and reduce the time taken by the microbes for digestion.

The method for hydrolyzing the organic solid comprises the following steps.

In Step 10, an organic solid and a nanobubble water are mixed to form an organic liquid, in which the organic solid comprises sewage/wastewater sludge, agriculture wastes, kitchen waste and animal manure, the nanobubble water has a plurality of nanobubbles, and the nanobubble contains a combustible gas.

In Step 11, an ultrasonic wave is applied on the organic liquid, such that the nanobubbles are inward cracked and burst to generate an additional cavitation effect, and the cavitation effect produces a high-temperature and high-pressure impact force in an extremely small range. It should be noted that, due to the volume characteristic of the nanobubbles, the nanobubbles will be uniformly distributed in the organic liquid and may not float up due to its own buoyancy, and thus the organic liquid is uniformly inflated, and the bursting positions caused by the cavitation effect are uniform. Moreover, the nanobubbles in Step 10 are filled with a combustible gas, such that when the nanobubbles generate the cavitation effect, due to the local high temperature of more than 5000° C. generated by the cavitation effect, combustion occurs simultaneously, which increases the impact force of the bursts and improves the efficiency of the organic solid hydrolysis. In an embodiment, the volume percent ratio of the nanobubble water and the organic solid in the organic liquid as Step 10 mentioned that is in a range of 0.05:1 to 1:1. The particle diameter of the nanobubbles contained in the nanobubble water is in a range of 10 nm to 999 nm. The combustible gas is methane, hydrogen gas, or a mixture thereof. The organic solid may be, but not limited to, a fibrous material, agricultural wastes, and sludge, animal manure or kitchen wastes.

In an embodiment, the output power of the ultrasonic wave in Step 11 may be, but not limited to, in a range of 300 Watt to 1200 Watt, and the frequency of the ultrasonic wave may be in a range of 20 kHz to 100 kHz. It is well-known to persons skilled in the art that, if the frequency of acoustic vibration exceeds 20 kHz, the acoustic wave is within the scope of ultrasonic wave, and the power of the ultrasonic wave is inversely proportional to the frequency, that is, with the same ultrasonic wave generator, the maximal power of the ultrasonic wave is generated at the frequency of 20 kHz. However, the frequency ranges of the ultrasonic wave in the specification are exemplified, but not intended to limit any technical features of the present disclosure.

Figure 2:
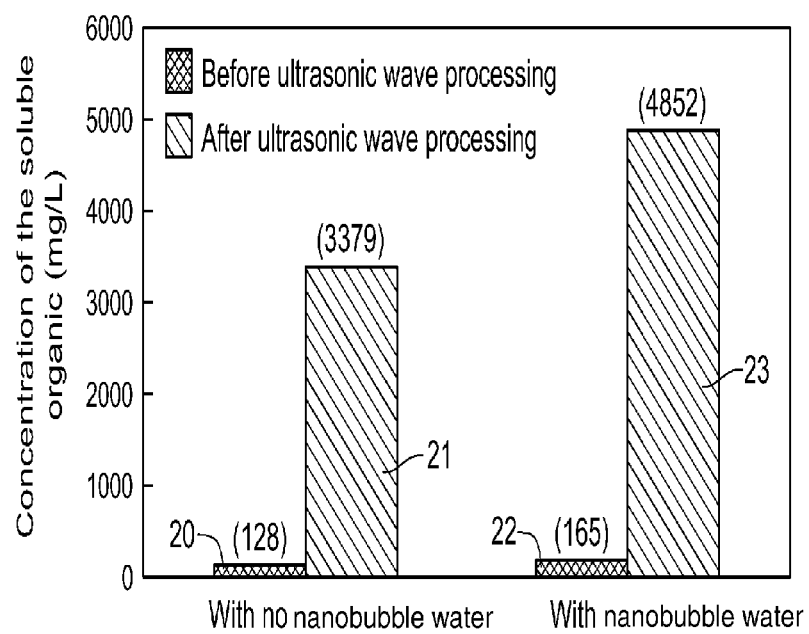
FIG. 2 is a schematic view of differences between processing of an organic sludge added with a nanobubble water and an organic sludge having no nanobubble water.

FIG. 2 is a schematic view of experimental results of ultrasonic wave processing of an organic sludge added with a nanobubble water and an organic sludge without nanobubble water. In FIG. 2, numbers on the longitudinal axis represent concentrations of a soluble organics in an organic liquid, in mg/L, and the concentration of the soluble organics generally represents a density of the organics distributed in a liquid. When the ultrasonic wave is hydrolyzed in the organic liquid, as the impact force produced by the cavitation effect damages the outer layer (for example, cell wall) of the organic sludge, the organics in the organic sludge flow out, and thus the concentration of the soluble organics in the organic liquid is increased. In short, if the concentration of the soluble organics is high, the soluble organic can be easily digested by aerobic or anaerobic microbes, and thus the overall digestion speed of the organic sludge is improved, and the digestion time of the organic sludge is reduced.

In this experiment, 150 mL organic sludge is mixed with 150 mL pure water and 150 mL nanobubble water having nanobubbles respectively. The concentration of suspended solids (SS) in the organic sludge is 8185 mg/L, and the concentration of volatile suspended solids (VSS) is 5895 mg/L. Next, the organic sludge is processed by an ultrasonic wave with a frequency of 20 kHz and a power of 700 Watt for 15 minutes. The experimental results are as shown in FIG. 2. The group of data on the left is the experimental data of the organic sludge having no nanobubble water, and has a concentration 20 of the soluble organic before the ultrasonic wave processing and a concentration 21 of the soluble organic after the ultrasonic wave processing, which are 128 mg/L and 3379 mg/L respectively. The group of data on the right is the experimental data of the organic sludge added with a nanobubble water, and has a concentration 22 of the soluble organic before the ultrasonic wave processing and a concentration 23 of the soluble organic after the ultrasonic wave processing, which are 165 mg/L and 4852 mg/L respectively. Therefore, it can be seen from FIG. 2 that, in the same circumstance, the efficiency of the organic sludge hydrolysis using nanobubbles is improved by 140%, as compared with the organic sludge hydrolysis not using nanobubbles.

Figure 3:
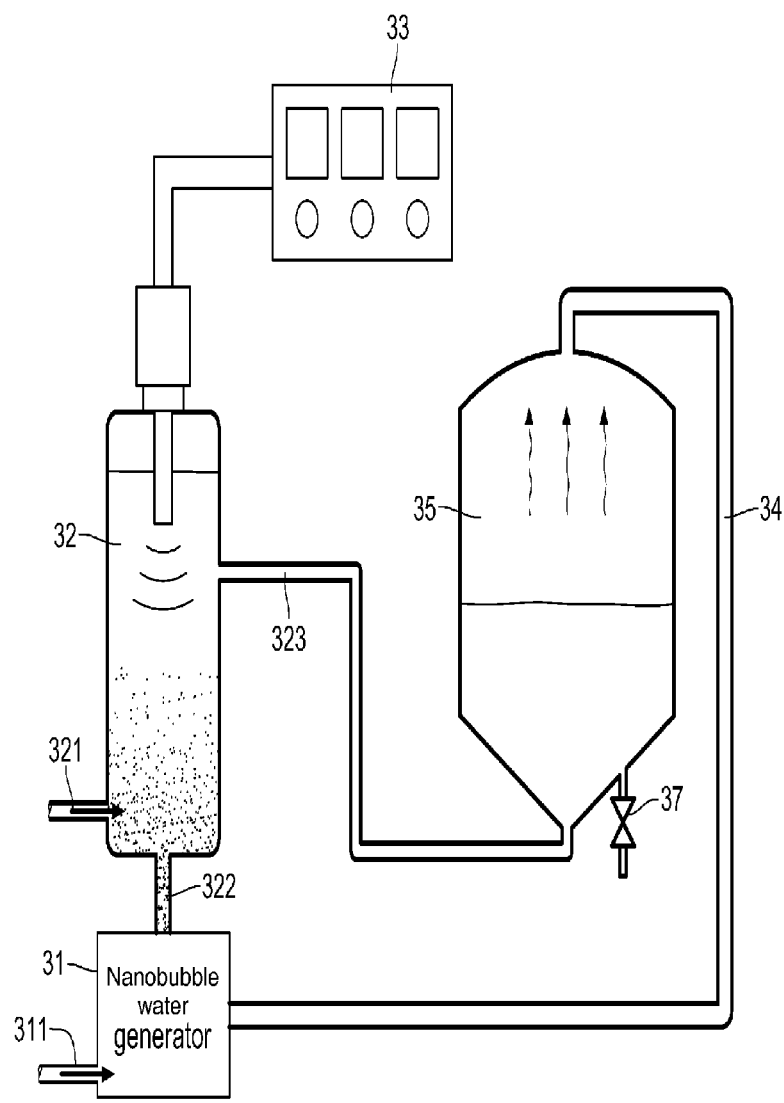
FIG. 3 is a schematic view of an embodiment of a preprocessor for hydrolyzing an organic solid according to the present disclosure.
Figure 4:
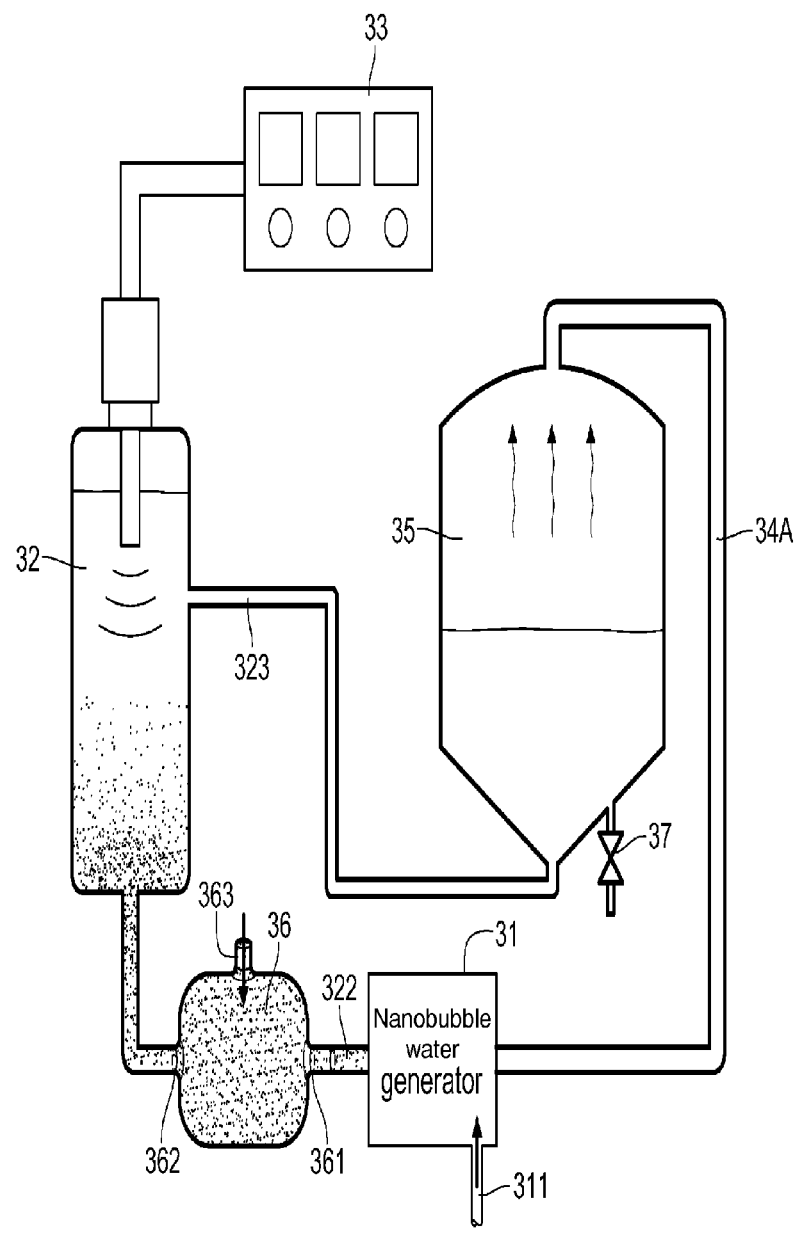
FIG. 4 is a schematic view of another embodiment of a preprocessor for hydrolyzing an organic solid according to the present disclosure.

FIG. 3 is a schematic view of an embodiment of a preprocessor for hydrolyzing an organic solid according to the present disclosure, and FIG. 4 is a schematic view of another embodiment of a preprocessor for hydrolyzing an organic solid according to the present disclosure. The preprocessor for hydrolyzing the organic solid of the present disclosure is applicable in an organic solid processing system having an anaerobic digestion tank 35. The anaerobic digestion tank 35 has anaerobic microbes, for generating a combustible gas, and the preprocessor comprises a nanobubble water generator 31, a ultrasonic tank 32, and an ultrasonic wave generator 33.

The nanobubble water generator 31 is used for making a plurality of nanobubbles by using the combustible gas generated from the anaerobic digestion tank 35, and mixing the nanobubbles with water to form a nanobubble water. The particle diameter of the nanobubbles is in a range of 10 nm to 999 nm. The ultrasonic tank 32 is used for accommodating an organic liquid formed by mixing the nanobubble water with an organic solid, in which the volume percent ratio of the nanobubble water and the organic solid is in a range of 0.05:1 to 1:1. The ultrasonic wave generator 33 is used for providing an ultrasonic wave energy having a maximal output power of 700 Watt and a frequency in a range of 20 kHz to 100 kHz for the ultrasonic tank 32, such that the nanobubbles in the organic liquid generate a cavitation effect, so as to crack the organic solid. Then, the cracked organic solid flows into the anaerobic digestion tank 35, to increase the generated amount of the biogas for subsequent anaerobic digestion, so as to improve the efficiency of renewable resources.

According to the embodiment as shown in FIG. 3, the preprocessor for hydrolyzing the organic solid of this embodiment further comprises a duct 34, connected between the anaerobic digestion tank 35 and the nanobubble water generator 31, and is used for guiding a part of the combustible gas generated by the anaerobic digestion tank 35 into the nanobubble water generator 31. The nanobubble water generator 31 has a water inlet 311 at one end, for allowing water to flow into the nanobubble water generator 31 and to be mixed to form the nanobubble water, and has a water outlet 322 at the other end. The ultrasonic tank 32 has an organic solid inlet 321 and a guide duct 323, in which an organic solid is filled into the ultrasonic tank 32 through the organic solid inlet 321 from the outside, and the nanobubble water flows into the ultrasonic tank 32 through the water outlet 322 of the nanobubble water generator 31, and is mixed in the ultrasonic tank 32 to form the organic liquid. Next, an ultrasonic wave energy is applied on the organic liquid by the ultrasonic wave generator 33, and a cavitation effect is generated. Then, the organic liquid to be treated by the ultrasonic wave is delivered to the anaerobic digestion tank 35 through the guide duct 323. In addition, the anaerobic digestion tank 35 may have a sludge outlet 37 in the lower portion thereof. Accordingly, the anaerobic microbes can be removed out of the anaerobic digestion tank 35 via the sludge outlet 37.

According to the embodiment as shown in FIG. 4, the preprocessor for hydrolyzing the organic solid of this embodiment further comprises a duct 34A and a mixing tank 36. The duct 34A connects the anaerobic digestion tank 35 and the nanobubble water generator 31, and is used for guiding a part of the combustible gas generated by the anaerobic digestion tank 35 into the nanobubble water generator 31. The nanobubble water generator 31 has a water inlet 311 at one end, for allowing water to flow into the nanobubble water generator 31 and to be mixed to form the nanobubble water. The mixing tank 36 has an organic solid inlet 363, a nanobubble water inlet 361, and an outlet 362. The organic solid is filled into the mixing tank 36 through the organic solid inlet 363 from the outside. The nanobubble water inlet 361 is connected to the nanobubble water generator 31. The nanobubble water flows into the mixing tank 36 from the nanobubble water inlet 361 of the mixing tank 36 through a water outlet 322 of the nanobubble water generator 31 and is mixed with the organic solid that forms an organic liquid. The outlet 362 is connected to the ultrasonic tank 32, and is used for delivering the organic liquid into the digestion tank 32. An ultrasonic wave energy is applied on the organic liquid by the ultrasonic wave generator 33, and a cavitation effect is generated. Then, the organic liquid is delivered to the anaerobic digestion tank 35 through the guide duct 323.

It should be noted that, the combustible gas in the present disclosure is corresponding to the combustible gas generated by digestion of the anaerobic microbes in the anaerobic digestion tank 35. The combustible gas comprises, but is not limited to, hydrogen gas, methane, or a mixture thereof, and herein the combustible gas is defined to be biogas.

In view of the above, in the method for hydrolyzing the organic solid of the present disclosure, the nanobubbles are used to increase the probability of generation of the additional cavitation effect, and the combustible gas is used to improve the effect of the impact force produced by the cavitation effect. Furthermore, according to the preprocessor for hydrolyzing the organic solid of the present disclosure, the combustible gas generated by the anaerobic digestion tank is recycled through the duct, which improves the applicability of the entire organic sludge processing system.

What is claimed is:

1. A method for hydrolyzing an organic solid, comprising:
mixing an organic solid and a nanobubble water, to form an organic liquid, wherein the nanobubble water has a plurality of nanobubbles, and the nanobubbles contain a combustible gas; and
applying an ultrasonic wave on the organic liquid, such that the nanobubbles generate a cavitation effect, to produce a bursting force to accelerate decomposition of the organic solid,
wherein an output power of the ultrasonic wave is in a range of 300 watt to 1200 watt, frequency of the ultrasonic wave is in a range of 20 kHz to 100 kHz, such that combustion of the combustible gas occurs due to the cavitation effect of the nanobubbles caused by the ultrasonic wave.

2. The method for hydrolyzing the organic solid according to claim 1, wherein a volume percent ratio of the nanobubble water and the organic solid in the organic liquid is in a range of 0.05:1 to 1:1.

3. The method for hydrolyzing the organic solid according to claim 1, wherein a particle diameter of the nanobubbles is in a range of 10 nm to 999 nm.

4. The method for hydrolyzing the organic solid according to claim 1, wherein the combustible gas is methane, oxygen gas, hydrogen gas, or a mixture thereof.

* * * * *